Patented May 25, 1937

2,081,865

UNITED STATES PATENT OFFICE 2,081,865

PROCESS FOR THE MANUFACTURE OF SULPHONATION PRODUCTS FROM HIGHER MOLECULAR ORGANIC COMPOUNDS

Eberhard Elbel, Dusseldorf, Germany, assignor to the firm Henkel & Cie. Gesellschaft mit beschränkter Haftung, Dusseldorf, Germany No Drawing. Application June 1, 1934, Serial No. 728,624. In Germany June 9, 1933

2 Claims. (Cl. 260—99.12)

This invention relates to the manufacture of highly concentrated sulphonation products from higher molecular organic compounds of the aliphatic or cycloaliphatic series.

According to the invention it has been found, that sulphonation products of excellent technical purity may be obtained from higher aliphatic or cycloaliphatic compounds and concentrated sulphuric acid in excess by treating the sulphonation mixture, preferably at raised temperature, with a solvent or a solvent mixture which is stable towards sulphuric acid and removing from the solution of the sulphonation product the separating excess of sulphuric acid.

As organic compounds preferably hydroxyl groups containing higher aliphatic or cycloaliphatic compounds are used containing at least one hydroxy group and at least 8 carbon atoms in the molecule. Such compounds are for instance the higher fatty alcohols, the naphthenic alcohols and the higher monoalkyl ethers of the glycol and the glycerol.

According to the invention the sulphonating agent consists of concentrated sulphuric acid. The term "concentrated sulphuric acid" is here meant to cover acids containing at least about 85% of $H_2SO_4$ and also sulphuric acid anhydride.

Several of the known solvents which are stable towards sulphuric acid may be used for the purpose of this invention. Very good results have been obtained with halogen hydrocarbons and particularly with the $\alpha$-$\beta$-dichlorethane. Also other hydrocarbons may be used, for instance benzine and the like. If desired, mixtures of two or more of the solvents named in the examples may be used.

When carrying out the novel invention the solvents may be added to the sulphonation mixture, preferably under heating. Preferably however, the sulphonation is carried out in the presence of the said indifferent solvents.

During the treatment the sulphonation mixture will separate in two layers. In some cases it may be advantageous to assist this separation by heating. The lower layer contains a sulphuric acid which is of a somewhat lower concentration than the acid originally used. The upper layer consists of a solution of the sulphonation product in the solvent used. The layers are separated from each other in a manner known per se.

From the solution the sulphonation product may be obtained by distillation, preferably after previous neutralization. The product is of excellent technical purity and does not contain essential amounts of salts of the sulphuric acid.

Examples (1) 210 parts by weight of the alcohols corresponding to the cocoa nut oil fatty acids are dissolved in 660 parts by weight of carbon tetrachloride and the solution is at 15° C. mixed with 196 parts by weight of sulphuric acid (100%) under vigorous stirring. The mixture is at first clear but turns turbid after some time and is then heated to 40–45° C. Hereby the mixture is separated into two layers, of which the lower one is removed. This layer (89 parts by weight) consists of sulphuric acid which has a concentration of about 85%. The upper layer is in vacuum freed from carbon tetrachloride and the sulphonation product obtained is neutralized with caustic soda lye in the usual way. After drying a sulphonate is obtained which has a net content of about 91% of neutralized sulphonation products.

(2) 210 parts by weight of a mixture of the alcohols corresponding to the cocoa nut fatty acids are dissolved in 620 parts by weight of $\alpha$-$\beta$-dichlorethane and the solution is mixed with 196 parts by weight of sulphuric acid (100%) at 15° C., while being well stirred. The further treatment takes place in the manner described in Example 1. The lower layer (96 parts by weight) consists of a sulphuric acid having a concentration of about 83,5%. The sodium salt of the sulphonation mixture is obtained with a net content of 92%.

(3) 210 parts by weight of a mixture of higher fatty alcohols are dissolved in 620 parts by weight of $\alpha$-$\beta$-dichlorethane and the solution is mixed with 250 parts by weight of sulphuric acid (96,4%) at 15° C., while being thoroughly stirred. The mixture is thereupon worked up in the manner disclosed in Example 1. The lower layer (150 parts by weight) consists of sulphuric acid of 81,5% concentration. The neutralized sulphonation mixture has a net content of about 91%.

(4) 210 parts by weight of a mixture of higher fatty alcohols are dissolved in 500 parts by weight of benzine having a boiling point of about 70–80° C. and the solution is mixed with 196 parts by weight of sulphuric acid (100%) at 15° C., while being well stirred. The further treatment takes place in the manner described in Example 1. The lower layer (about 70 parts by weight) consists of sulphuric acid of 84,7% concentration. The neutralized sulphonation mixture contains about 83% of pure sulphonation product.

(5) 210 parts by weight of a mixture of higher fatty alcohols are dissolved in 610 parts by weight of trichlorethylene and 196 parts by weight of sulphuric acid (100%) are gradually added while being thoroughly stirred. The addition of sulphuric acid is so controlled that a temperature of 41–42° C. is obtained. The reaction mixture is maintained at this temperature for some time while being well stirred. The two layers formed are separated. The lower layer (86 parts by weight) consists of sulphuric acid of 84,7% concentration. The upper layer is freed from the solvent in vacuum, neutralized with caustic soda lye and dried. The end product obtained contains about 91% of pure sulphonation mixture.

(6) 210 parts by weight of a mixture of higher fatty alcohols are dissolved in 520 parts by weight of $\alpha$-$\beta$-dichlorethane and 196 parts by weight of sulphuric acid (100%) are added in the manner described in Example 2. The lower layer of the reaction product consists of 90,5 parts by weight of sulphuric acid of 82,3% concentration. The neutralized end product contains about 90% of pure sulphonation products.

I claim:

1. A process for the manufacture of highly concentrated sulphonation products from higher molecular organic compounds of the aliphatic or cycloaliphatic series with at least one primary alcohol residue and at least 8 carbon atoms, comprising sulphonating such substances with concentrated sulphuric acid in excess in the presence of a solvent which is indifferent towards sulphuric acid, forming by heating two layers the lower of which contains the remaining sulphuric acid and the upper of which consists of a solution of the sulphonation product in the solvent, separating the upper layer from the lower and removing the solvent from the sulphonation product.

2. A process for the manufacture of highly concentrated sulphonation products from higher molecular organic compounds of the aliphatic or cycloaliphatic series with at least one primary alcohol residue and at least 8 carbon atoms, comprising sulphonating such substances with concentrated sulphuric acid in excess in the presence of a mixture of solvents which are indifferent towards sulphuric acid, forming by heating two layers the lower of which contains the remaining sulphuric acid and the upper of which consists of a solution of the sulphonation product in the mixture of solvents, separating the upper layer from the lower and removing the mixture of solvents from the sulphonation product.

EBERHARD ELBEL.